B. CONRATH.
ADJUSTABLE BRAKE HEAD.
APPLICATION FILED FEB. 8, 1911.
1,010,022.
Patented Nov. 28, 1911.
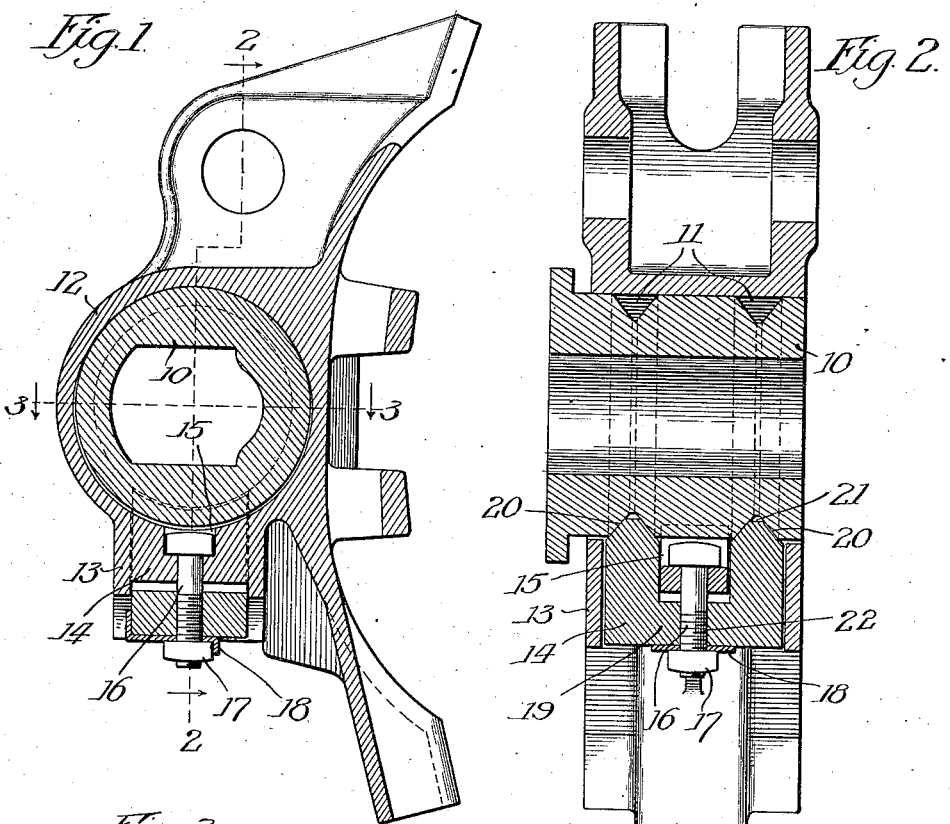
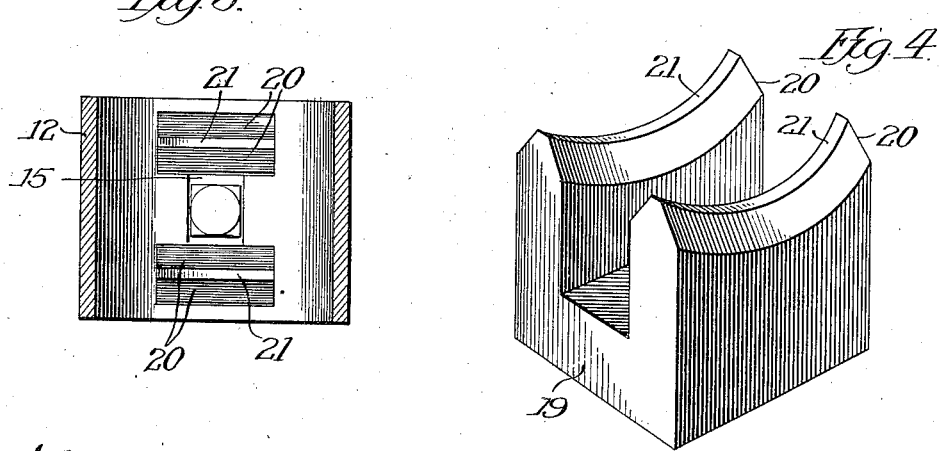
Witnesses:
Inventor:
Bernard Conrath
By Linthicum Bell Fuller
Attys.

UNITED STATES PATENT OFFICE.

BERNARD CONRATH, OF HAMMOND, INDIANA, ASSIGNOR TO SIMPLEX RAILWAY APPLIANCE COMPANY, OF CHICAGO, ILLINOIS, A CORPORATION OF ILLINOIS.

ADJUSTABLE BRAKE-HEAD.

1,010,022.     Specification of Letters Patent.     Patented Nov. 28, 1911.

Application filed February 8, 1911. Serial No. 607,348.

*To all whom it may concern:*

Be it known that I, BERNARD CONRATH, a citizen of the United States, residing at Hammond, in the county of Lake and State of Indiana, have invented certain new and useful Improvements in Adjustable Brake-Heads, of which the following is a specification.

My invention relates to adjustable brake heads and has particular reference to a brake head of this character which shall be of exceedingly simple construction.

I am aware that many forms of adjustable brake heads have been devised, some of which are very efficient in operation. I have provided, however, by my improved construction, a form of adjustable brake head which is of exceedingly simple construction, which provides for quick and efficient adjustment and which does not rely on springs for its holding capacity. I have also provided in my improved brake head, means whereby wear of the parts is compensated for.

My invention will be more readily understood by reference to the accompanying drawings wherein—

Figure 1 is a cross section of the brake head having my improved locking means applied thereto; Fig. 2 is a section on line 2—2 of Fig. 1; Fig. 3 is a section on the line 3—3 of Fig. 1, the sleeve being omitted and Fig. 4 is an enlarged perspective view of my improved locking block.

Referring more particularly to the drawings, it will be understood that the brake beam is composed of the usual compression and tension members, not herein shown, the two members united at their ends by means of sleeve 10. This sleeve 10 is provided with peripheral grooves 11, herein shown as two in number. It will be understood that this number may be increased if desired or that one long groove may be formed. Rotatably mounted on the sleeve 10 I provide the brake head 12 having a hollow downwardly projecting housing 13, the lower end of which is open. Extending across the interior of the housing 13 I provide an integral strut 14 having a seat 15 therein of a size adapted to accommodate the head of an adjusting bolt 16, the bolt having an adjusting nut 17 and a nut lock 18.

My improved locking block 19 is provided with a pair of upward projections 20 having their upper surfaces shaped to conform to the grooves in the periphery of the sleeve 10. Portions of the upward projections are removed, as shown at 21, in order to compensate for wear of the locking surfaces. In other words, as the wedge surfaces become worn the parts may extend farther within the grooves in the head. An opening 22 is provided in the locking block adapted to accommodate the shank of the bolt 16.

In operation, assuming the sleeve 10 to be secured on the brake beam, the brake head 12 is slipped on the sleeve, the bolt 16 having previously been seated in the opening 15 provided therefor. The locking block 19 is then inserted in the housing 13 and the upper portions thereof registered with the grooves 11 in the sleeve. The nut 17 is then applied to the bolt and upward pressure exerted on the locking block in order to force the same securely within the grooves 11 of the sleeve.

As will be seen, the head cannot be removed accidentally, or otherwise, from the sleeve until the nut 17 has been completely removed from the bolt inasmuch as the upper portions of the locking block cannot descend far enough to permit the head to be removed from the sleeve.

It will be understood also, as mentioned above, that the number and shape of the grooves and of the locking block may be varied and that other modifications may be made without departing from the spirit of my invention.

I claim:

1. An adjustable brake head, comprising, in combination, a sleeve having a plurality of triangular peripheral grooves therein, a locking block carried by said head and having portions adapted to register with said grooves, the registering portions of said locking block having a cross section substantially in the form of a regular trapezoid, a strut in said head, and means for transmitting a positive thrust from said strut to said locking block, substantially as described.

2. An adjustable brake head comprising, in combination, a sleeve having a series of substantially triangular, peripheral grooves therein, a locking block carried by said brake head, said locking block having a series of upwardly projecting triangular surfaces adapted to register with the grooves in said sleeve, a strut in said brake head, and means connected to said strut and said locking block to force the latter against the said sleeve, substantially as described.

3. An adjustable brake head comprising, in combination, a sleeve having a plurality of triangular locking surfaces thereon, a locking block carried by said head, a strut in said head, and means for positively thrusting said locking block against said sleeve, substantially as described.

BERNARD CONRATH.

Witnesses:
 LOREN L. WHITNEY,
 CARL E. BAUER.

Copies of this patent may be obtained for five cents each, by addressing the "Commissioner of Patents, Washington, D. C."